(12) United States Patent
Petrescu-Prahova et al.

(10) Patent No.: US 9,135,037 B1
(45) Date of Patent: Sep. 15, 2015

(54) VIRTUAL NETWORK PROTOCOL

(75) Inventors: Cristian Petrescu-Prahova, Seattle, WA (US); Christoph Kern, Bambridge Island, WA (US); Evan K. Anderson, Seattle, WA (US); Joseph S. Beda, III, Seattle, WA (US)

(73) Assignee: Google Inc., Mountain View, CA (US)

( * ) Notice: Subject to any disclaimer, the term of this patent is extended or adjusted under 35 U.S.C. 154(b) by 608 days.

(21) Appl. No.: 13/350,470

(22) Filed: Jan. 13, 2012

Related U.S. Application Data

(60) Provisional application No. 61/432,531, filed on Jan. 13, 2011.

(51) Int. Cl.
*G06F 9/455* (2006.01)
*H04L 12/46* (2006.01)

(52) U.S. Cl.
CPC ......... *G06F 9/45533* (2013.01); *H04L 12/4633* (2013.01)

(58) Field of Classification Search
None
See application file for complete search history.

(56) References Cited

U.S. PATENT DOCUMENTS

| | | | |
|---|---|---|---|
| 4,464,749 A * | 8/1984 | Ulug | 370/451 |
| 5,463,768 A | 10/1995 | Cudihy et al. | |
| 5,655,081 A | 8/1997 | Bonnell et al. | |
| 5,778,444 A | 7/1998 | Langan et al. | |
| 5,794,224 A | 8/1998 | Yufik | |
| 6,148,368 A | 11/2000 | DeKoning | |
| 6,178,482 B1 | 1/2001 | Sollars | |
| 6,449,671 B1 | 9/2002 | Patkar et al. | |
| 6,505,211 B1 | 1/2003 | Dessloch et al. | |
| 6,505,248 B1 | 1/2003 | Casper et al. | |
| 6,587,866 B1 | 7/2003 | Modi et al. | |
| 6,598,179 B1 | 7/2003 | Chirashnya et al. | |
| 6,643,613 B2 | 11/2003 | McGee et al. | |
| 6,829,678 B1 | 12/2004 | Sawdon et al. | |
| 6,891,839 B2 | 5/2005 | Albert et al. | |
| 6,898,697 B1 | 5/2005 | Gao et al. | |
| 6,996,502 B2 | 2/2006 | De La Cruz et al. | |
| 7,043,455 B1 | 5/2006 | Cuomo et al. | |
| 7,062,718 B2 | 6/2006 | Kodosky et al. | |
| 7,117,243 B2 | 10/2006 | Peart | |
| 7,263,497 B1 * | 8/2007 | Wiser et al. | 705/51 |

(Continued)

FOREIGN PATENT DOCUMENTS

| | | |
|---|---|---|
| EP | 0909058 | 7/2010 |
| WO | WO 2011/095516 | 8/2011 |
| WO | WO 2012/039834 | 3/2012 |

OTHER PUBLICATIONS

Moller, Jan, et al., "Internal Network Security", Feb. 1, 2000-May 18, 2001, Retrieved from the Internet: <URL: http://www.daimi.au.dk/~fwiffo/thesis/>, 183 pages.

(Continued)

*Primary Examiner* — Kenneth Tang
(74) *Attorney, Agent, or Firm* — Fish & Richardson P.C.

(57) ABSTRACT

Methods, systems, and apparatus, including computer programs encoded on a computer storage medium, for receiving an outgoing packet from a source virtual machine; obtaining a secret key for the source virtual machine, the secret key not being known by a destination virtual machine; obtaining a unique token derived at least partly from the secret key and a network address of the destination virtual machine; encapsulating the outgoing packet in a second packet along with the token and a token expiration time; and sending the second packet to the destination virtual machine.

27 Claims, 5 Drawing Sheets

(56) References Cited

U.S. PATENT DOCUMENTS

| | | | |
|---|---|---|---|
| 7,466,703 B1 | 12/2008 | Arunachalam et al. |
| 7,478,388 B1 | 1/2009 | Chen et al. |
| 7,500,262 B1 | 3/2009 | Sanin et al. |
| 7,529,836 B1 | 5/2009 | Bolen et al. |
| 7,584,467 B2 | 9/2009 | Wickham et al. |
| 7,596,620 B1 | 9/2009 | Colton et al. |
| 7,650,331 B1 | 1/2010 | Dean et al. |
| 7,653,833 B1 | 1/2010 | Miller et al. |
| 7,761,573 B2 | 7/2010 | Travostino et al. |
| 7,804,862 B1 | 9/2010 | Olson et al. |
| 7,836,285 B2 | 11/2010 | Giri et al. |
| 8,051,414 B2 | 11/2011 | Stender et al. |
| 8,065,717 B2 | 11/2011 | Band |
| 8,103,771 B2 | 1/2012 | Tanaka et al. |
| 8,108,903 B2 | 1/2012 | Norefors et al. |
| 8,146,147 B2 | 3/2012 | Litvin et al. |
| 8,261,295 B1 | 9/2012 | Risbood et al. |
| 8,276,140 B1 | 9/2012 | Beda et al. |
| 8,296,459 B1 | 10/2012 | Brandwine et al. |
| 8,312,272 B1 * | 11/2012 | Serenyi et al. ............ 713/168 |
| 8,407,687 B2 | 3/2013 | Moshir et al. |
| 8,423,993 B2 | 4/2013 | Faus et al. |
| 8,484,353 B1 | 7/2013 | Johnson et al. |
| 8,504,844 B2 | 8/2013 | Browning |
| 8,533,796 B1 | 9/2013 | Shenoy et al. |
| 2002/0091902 A1 | 7/2002 | Hirofuji |
| 2002/0097747 A1 | 7/2002 | Kirkby |
| 2004/0139368 A1 | 7/2004 | Austen et al. |
| 2004/0148484 A1 | 7/2004 | Watanabe et al. |
| 2004/0210653 A1 | 10/2004 | Kanoor et al. |
| 2004/0221032 A1 * | 11/2004 | Bernstein et al. ............ 709/224 |
| 2005/0010715 A1 | 1/2005 | Davies et al. |
| 2005/0166011 A1 | 7/2005 | Burnett et al. |
| 2005/0196030 A1 | 9/2005 | Schofield et al. |
| 2005/0216659 A1 | 9/2005 | Ogawa et al. |
| 2005/0237543 A1 | 10/2005 | Kikuchi |
| 2005/0289499 A1 | 12/2005 | Ogawa et al. |
| 2006/0026354 A1 | 2/2006 | Lesot et al. |
| 2006/0048077 A1 | 3/2006 | Boyles |
| 2006/0048130 A1 | 3/2006 | Napier et al. |
| 2006/0059228 A1 | 3/2006 | Kasamsetty et al. |
| 2006/0067236 A1 | 3/2006 | Gupta |
| 2006/0075199 A1 | 4/2006 | Kallahalla et al. |
| 2006/0098618 A1 | 5/2006 | Bouffioux |
| 2006/0136676 A1 | 6/2006 | Park et al. |
| 2006/0153099 A1 | 7/2006 | Feldman |
| 2006/0161753 A1 | 7/2006 | Aschoff et al. |
| 2006/0271547 A1 | 11/2006 | Chen et al. |
| 2007/0011361 A1 | 1/2007 | Okada et al. |
| 2007/0112956 A1 | 5/2007 | Chapman et al. |
| 2007/0115982 A1 * | 5/2007 | Pope et al. ................ 370/392 |
| 2007/0118694 A1 | 5/2007 | Watanabe et al. |
| 2007/0123276 A1 | 5/2007 | Parker et al. |
| 2007/0177198 A1 | 8/2007 | Miyata |
| 2007/0199058 A1 | 8/2007 | Baumgart et al. |
| 2007/0271604 A1 | 11/2007 | Webster et al. |
| 2007/0280243 A1 | 12/2007 | Wray et al. |
| 2008/0028389 A1 | 1/2008 | Genty et al. |
| 2008/0086515 A1 | 4/2008 | Bai et al. |
| 2008/0095176 A1 | 4/2008 | Ong et al. |
| 2008/0107112 A1 | 5/2008 | Kuo et al. |
| 2008/0205415 A1 | 8/2008 | Morales |
| 2008/0208681 A1 | 8/2008 | Hammad et al. |
| 2008/0215796 A1 | 9/2008 | Lam et al. |
| 2008/0222246 A1 | 9/2008 | Ebling et al. |
| 2008/0222375 A1 | 9/2008 | Kotsovinos et al. |
| 2008/0244030 A1 | 10/2008 | Leitheiser |
| 2008/0244471 A1 | 10/2008 | Killian et al. |
| 2008/0250407 A1 | 10/2008 | Dadhia et al. |
| 2008/0270704 A1 | 10/2008 | He et al. |
| 2008/0304516 A1 | 12/2008 | Feng et al. |
| 2008/0307258 A1 | 12/2008 | Challenger et al. |
| 2008/0310324 A1 | 12/2008 | Chaponniere |
| 2009/0097657 A1 | 4/2009 | Scheidt et al. |
| 2009/0150629 A1 | 6/2009 | Noguchi et al. |
| 2009/0199177 A1 | 8/2009 | Edwards et al. |
| 2009/0222815 A1 | 9/2009 | Dake |
| 2009/0241108 A1 | 9/2009 | Edwards et al. |
| 2009/0249440 A1 | 10/2009 | Platt et al. |
| 2009/0276771 A1 | 11/2009 | Nickolov et al. |
| 2009/0282266 A1 | 11/2009 | Fries et al. |
| 2009/0300605 A1 | 12/2009 | Edwards et al. |
| 2009/0310554 A1 | 12/2009 | Sun et al. |
| 2010/0017859 A1 | 1/2010 | Kelly |
| 2010/0023582 A1 | 1/2010 | Pedersen et al. |
| 2010/0046426 A1 | 2/2010 | Shenoy et al. |
| 2010/0057913 A1 | 3/2010 | DeHaan |
| 2010/0071035 A1 | 3/2010 | Budko et al. |
| 2010/0088335 A1 | 4/2010 | Mimatsu |
| 2010/0094999 A1 | 4/2010 | Rama et al. |
| 2010/0095000 A1 | 4/2010 | Kettler et al. |
| 2010/0199089 A1 | 8/2010 | Vysogorets et al. |
| 2010/0212004 A1 | 8/2010 | Fu |
| 2010/0215050 A1 | 8/2010 | Kanada |
| 2010/0217927 A1 | 8/2010 | Song |
| 2010/0235649 A1 | 9/2010 | Jeffries et al. |
| 2010/0274984 A1 | 10/2010 | Inomata et al. |
| 2010/0287548 A1 | 11/2010 | Zhou et al. |
| 2010/0293285 A1 | 11/2010 | Oishi et al. |
| 2010/0303241 A1 | 12/2010 | Breyel |
| 2011/0010483 A1 | 1/2011 | Liljeberg |
| 2011/0022812 A1 | 1/2011 | van der Linden et al. |
| 2011/0055361 A1 | 3/2011 | DeHaan |
| 2011/0075674 A1 * | 3/2011 | Li et al. ................ 370/401 |
| 2011/0085563 A1 | 4/2011 | Kotha et al. |
| 2011/0153838 A1 | 6/2011 | Belkine et al. |
| 2011/0191485 A1 | 8/2011 | Umbehocker |
| 2011/0191768 A1 | 8/2011 | Smith |
| 2011/0231280 A1 | 9/2011 | Farah |
| 2011/0258441 A1 | 10/2011 | Ashok et al. |
| 2012/0096271 A1 * | 4/2012 | Ramarathinam et al. ..... 713/172 |
| 2012/0185688 A1 | 7/2012 | Thornton |
| 2012/0191912 A1 | 7/2012 | Kadatch et al. |
| 2013/0227303 A1 | 8/2012 | Kadatch et al. |
| 2012/0233678 A1 | 9/2012 | Pal |
| 2012/0233705 A1 | 9/2012 | Boysen et al. |
| 2012/0246637 A1 | 9/2012 | Kreeger et al. |
| 2012/0266159 A1 | 10/2012 | Risbood et al. |
| 2013/0074181 A1 | 3/2013 | Singh |
| 2013/0081014 A1 | 3/2013 | Kadatch et al. |
| 2013/0117801 A1 | 5/2013 | Shieh et al. |
| 2013/0212709 A1 | 8/2013 | Tucker |
| 2013/0262405 A1 | 10/2013 | Kadatch et al. |
| 2014/0096134 A1 * | 4/2014 | Barak et al. ................ 718/1 |

OTHER PUBLICATIONS

Primet, Pascale, et al., "HIPCAL: State of the Art of OS and Network virtualization solutions for Grids", Sep. 14, 2007, 38 pages.

Wikipedia, "IPSec", [online] [retrieved on Jan. 4, 2011]. Retrieved from the Internet: <URL: http://en.wikipedia.org/wiki/IPsec/>, 8 pages.

Abdull, AlastairIrvine, et al. "Generic Routing Encapsulation", [online] [retrieved on Jan. 4, 2011]. Retrieved from the Internet: <URL: http://creativecommons.org/licenses/by-sa/3.0/>, 5 pages.

Farinacci et al., "RFC 2784: Generic Routing Encapsulation (GRE)", Mar. 2000, The Internet Society, 10 pages.

Kent et al., "RFC 4301: Security Architecture for the Internet Protocol", Dec. 2005, The Internet Society, 102 pages.

Wikipedia, "Domain Name System". [online] [Retrieved on Feb. 4, 2012]. Retrieved from the Internet: <URL: http://en.wikipedia.org/wiki/Domain_Name_System>, 13 pages.

Bucket Explorer. "What is my AWS Access and Secret Key." [Retrieved Apr. 26, 2011]. Retrieved from the Internet <URL: http://www.bucketexplorer.com/documentation/amazon-s3—what-is-my-aws-access-and-secret-key.html>, 1 page.

Hongkiat. "Amazon S3—The Beginner's Guide." [Retrieved on Apr. 26, 2011]. Retrieved from the Internet <URL: http://www.hongkiat.com/blog/amazon-s3-the-beginners-guide/>, 9 pages.

Myerson, Judith. "Creating Applications with Amazon EC2 and S3." O'ReillyOnLamp.com, May 13, 2008 [Retrieved on Apr. 26, 2011].

(56) References Cited

OTHER PUBLICATIONS

Retrieved from the Internet <URL: http://onlamp.com/pub/a/onlamp/2008/05/13/creating-applications-with-amazon-ec2-and-s3.html>, 8 pages.
Wikipedia. "OAuth." [online] [Retrieved on Jan. 20, 2011]. Retrieved from the Internet <URL: http://en.wikipedia.org/wiki/OAuth>, 3 pages.
Gowalla. "API Documentation—Oauth." [Retrieved on Apr. 26, 2011]. Retrieved from the Internet <URL: http://gowalla.com/api/docs/oauth>, 4 pages.
Apache HTTP Server Version 2.0. "Log Files." [Retrieved on Feb. 15, 2011]. Retrieved from the Internet <URL: http://httpd.apache.org/docs/2.0/logs.html>, 7 pages.
Microsoft Support. "How to view and manage event logs in Event Viewer in Windows XP." May 7, 2007, version 3.5 [Retrieved on Feb. 15, 2011]. Retrieved from the Internet <URL: http://support.microsoft.com/kb/308427>, 6 pages.
MSDN. "Visual Basic Concepts, Visual Studio 6.0: Centralized Error Handling." [Retrieved on Feb. 15, 2011]. Retrieved from the Internet <URL: http://msdn.microsoft.com/en-us/library/aa240795(d=printer, v=vs.60).aspx>, 4 pages.
Laitinen, Aapo et al., Network Address Translation [Retrieved on Oct. 10, 2011] Retrieved from the Internet: <URL: http://en.wikipedia.org/wiki/Networkpages_Address_and_Port_Translation>, 11 pages.
Wikipedia., Anycast [Retrieved on Oct. 10, 2011] Retrieved from the Internet: URL<http://en.wikipedia.org/wiki/Anycast>, 5 pages.
VMCI Overview [Retrieved on Jun. 8, 2011] Retrieved from the Internet: <URL: http://pubs.vmware.com/vmci-sdk/VMCI_intro.html>, 3 pages.
VMware vSphere [Retrieved on Jun. 8, 2011] Retrieved from the Internet: <URL: http://www.vmware.com/products/vmotion/overview.html>, 2 pages.
VMCI Datagram API [Retrieved on Jun. 8, 2011], Retrieved from the Internet: <URL: http://pubs.vmware.com/vmci-sdk/datagram.html>, 1 page.
VMCI Datagram_SendTo [Retrieved on Jun. 8, 2011], Retrieved from the Internet: <URL: http://pubs.vmware.com/vmci-sdk/functions/VMCIDatagram_SendTo.html>, 1 page.
VMCIDs_Lookup [Retrieved on Jun. 8, 2011], Retrieved from the Internet: <URL: http://pubs.vmware.com/vmci-sdk/functions/VMCIDs_Lookup.html>, 2 pages.
Chen, Per M., et al., : "Maximizing Performance in a Striped Disk Array", 17th Annual International Symposium on Computer Architecture (SIGARCH 1990), 18 pages.
Sarhan, Nabil J., et al., "Caching and Scheduling in NAD-Based Multimedia Servers"; IEEE Computer Society, IEEE Transactions on Parallel and Distributed Systems, vol. 15, No. 10, Oct. 2004; pp. 921-933.
Vazhkudai, Sudharshan S., et al.; "Constructing Collaborative Desktop Storage Caches for Large Scientific Datasets"; ACM Journal Name, vol. V, No. N, Jun. 2006, 34 pages.
OMG, Deployment and Configuration of Component-based Distributed Applications Specification—Version 4.0, OMG, 2006, pp. 1-160.
Cala et al., "Automatic Software Deployment in the Azure Cloud", IFIP International Federation for Information Processing, 2010, pp. 1-14.
RSA Laboratories, "PKCS #11 v2.20: Cryptographic Token Interface Standard," Jun. 28, 2004, RSA Security Inc. (407 pages).
Amazon Auto Scaling—Getting Started Guide—API Version Aug. 1, 2010. Amazon Web Services LLC, 2010, 20 pages.
Amazon Auto Scaling—Developer Guide—API Version Aug. 1, 2010. Amazon Web Services LLC, 2011, 62 pages.
Amazon CloudWatch—Developer Guide—API Version Aug. 1, 2010. Amazon Web Services LLC, 2010, 75 pages.
Benincosa. "Ganglia and Nagios, Part 2: Monitor enterprise clusters with Nagios-Install Nagios to effectively monitor a data center; make Ganglia and Nagios work together," 2009, 20 pages.
'Nagios' [online]. "Monitoring Linux/Unix Machines," 2011, [retrieved on Feb. 3, 2011]. Retrieved from the Internet: URL: <http://nagios.sourceforge.net/docs/3_0/monitoring-linux.html > 1 page.
'Nagios' [online]. "Nagios Plugins," 2011, [retrieved on Feb. 3, 2011]. Retrieved from the Internet: URL: <http://nagios.sourceforge.net/docs/3_0/plugins.html > 2 pages.
Travostino, Franco, et al., Seamless Live Migration of Virtual Machines over the MAN/WAN, 2006, Elsevier Future Generation Computer Systems 2006, 10 pages.
'Zabbix' [online]. "Zabbix 1.8: The Ultimate Open Source Monitoring Solution," 2001-2012, [retrieved on Feb. 3, 2011]. Retrieved from the Internet: URL: <http://www.zabbix.com/features.php.> 1 page.
Amazon Elastic Compute Cloud, User Guide, API Version Mar. 1, 2012, pp. 97-103, downloaded from http://docs.amazonwebservices.com/AWSEC2/latest/UserGuide/AESDG-chapter-instancedata.html?r=4276 on Mar. 18, 2012.
Paravirtualization, Wikipedia Article, downloaded from http://en.wikipedia.org/wiki/Paravirtualization on Mar. 18, 2012.
Paravirtualized File Systems, Eric Van Hensbergen, downloaded from http://www.slideshare.net/ericvh/9p-on-kvm on Mar. 18, 2012.
"IPsec". Creativecommons.org [online]. Creative Commons Attribution-Share Alike 3.0 Unported. [retrieved on Jan. 14, 2011]. Retrieved from the Internet<URL: http://creativecommons.org/licenses/by-sa/3.0/ >, pp. 1-8.
"Generic Routing Encapsulation". Creativecommons.org [online]. Creative Commons Attribution-Share Alike 3.0 Unported. [retrieved on Jan. 14, 2011]. Retrieved from the Internet:<URL: http://creativecommons.org/licenses/by-sa/3.0/ >, pp. 1-5.
Cloud Computing Course, Part 2: Amazon's EC2, Marcel Gagne, Jun. 13, 2011. Retrieved from the Internet: <URL: http://marcelgagne.com/content/cloud-computing-course-part-2-amazons-ec2>, 6 pages.
How to: Getting Started With Amazon EC2, Paul Stamatiou, Apr. 5, 2008. Retrieved from the Internet: <URL:http//paulstamatiou.com/how-to-getting-started-with-amazon-ec2>, 25 pages.
Uploading Personal ssh Keys to Amazon EC2, Eric Hammond, Oct. 14, 2010. Retrieved from the Internet: <URL:http://alestic.com/2010/10/ec2-ssh-keys>, 3 pages.
Key Management in Cloud Datacenters, Security Stackexchange.com, Retrieved from the Internet on Nov. 18, 2011; Retrieved from: <URL: http://security.stackexchange.com/questions/2514/key-management-in-cloud-datacenters>, 2 pages.
Managing Amazon EC2—SSH Login and Protecting Your Instances, Everyday's Findings, Monday, May 18, 2009, Retrieved from the Internet on Nov. 18, 2011; Retrieved from: <URL: http://blog.taggesell.de/index.php?/aarchives/73-Managing-Amazon-EC2., 6 pages.
Using and Managing AWS—Part 6: SSH Key Pairs, Top WordPress, May 26, 2009, Retrieved from the Internet: <URL: http://clouddb.info/2009/05/26/using-and-managing-aws-part-6-ssh-key-pairs>, 5 pages.
L. Gommans, et al., Token-Based Authorization of Connection Oriented Network Resources, 1st International Workshop on Networks for Grid Applications (GridNets 2004), Oct. 29, 2004; 8 pages.
Hyun, Ahn Ji, Authorized Officer for Korean Intellectual Property Office, International Search Report and Written Opinion for PCT/US2012/021846, International Search Report completed May 25, 2012, 8 pages.
Na, Lee Da, Authorized Officer for Korean Intellectual Property Office, International Search Report and Written Opinion for PCT/US2012/020954, International Search Report completed Aug. 23, 2012, 10 pages.
Alpern, B., "The Jalapeno virtual machine," IBM Systems Journal, Jan. 2000, vol. 39, Issue 1, pp. 211-238.
Bok, Jin Yo, Authorized Officer for Korean Intellectual Property Office, International Search Report and Written Opinion for PCT/US2012/029210, International Search Report completed Oct. 10, 2012, 2 pages.

(56) References Cited

OTHER PUBLICATIONS

Anonymous, Storage I/O Control Technical Overview and Consideration for Deployment VMware vSphere ™ 4.1, Jan. 1, 2010, XP05504491, retrieved from the internet: URL: http://www.vmware.com/fled/pdf/techpaper/WMW-vSphere41-SIOC.pdf; [retrieved on Nov. 21, 2012], the entire document.

Cabellos et al., LISPmob: Mobile Networking through LISP, Apr. 2, 2012, 8 pages.

Steinmetz, Christof, Authorized Office for European Patent Office, International Search Report and Written Opinion for PCT/US2013/034140, completed Jun. 25, 2013, 21 pages.

Hehn, Eva, Authorized Office for European Patent Office, International Search Report and Written Opinion for PCT/US2013/027456, completed Jun. 24, 2013, 11 pages.

Eng, Lili, Australian Government, IP Australia, Examiner's First Report for 2012200562, dated Jun. 4, 2012, 2 pages.

\* cited by examiner

VIRTUAL NETWORK PROTOCOL

CROSS-REFERENCE TO RELATED APPLICATIONS

Under 35 U.S.C. §119, this application claims benefit of U.S. Provisional Application Ser. No. 61/432,531, filed Jan. 13, 2011, the entire contents of which are hereby incorporated by reference.

BACKGROUND

This specification relates to providing virtual communication networks, and more specifically to virtual communication networks for virtual machines.

Cloud computing is network-based computing in which typically large collections of servers housed in data centers or "server farms" provide computational resources and data storage as needed to remote end users. Some cloud computing services provide access to software applications such as word processors and other commonly used applications to end users who interface with the applications through web browsers or other client-side software. Users' electronic data files are usually stored in the server farm rather than on the users' computing devices. Maintaining software applications and user data on a server farm simplifies management of end user computing devices. Some cloud computing services allow end users to execute software applications in virtual machines.

SUMMARY

In general, one innovative aspect of the subject matter described in this specification can be embodied in methods that include actions in a user process space of a host operating system, in which the host operating system hosts one or more distinct virtual machines each being a hardware virtualization of the data processing apparatus, performing the following: receiving an outgoing packet from a source virtual machine (VM) in the virtual machines, the outgoing packet destined for a destination VM; obtaining a secret key for the source VM, the secret key not being known by the destination VM; obtaining a unique token derived at least partly from the secret key and a network address of the destination VM; encapsulating the outgoing packet in a second packet along with the token and a token expiration time; and sending the second packet to the destination VM. Other embodiments of this aspect include corresponding systems, apparatus, and computer programs.

These and other aspects can optionally include one or more of the following features. The actions can further comprise: receiving the second packet; verifying the token; and de-encapsulating the second packet and providing it to the destination VM responsive to the verifying. The second packet can include a token that the destination VM can use to send a packet to the source VM. The token can be a hash-based message authentication code. A respective guest operating system can execute on each of the virtual machines. The destination VM can be on a same physical machine as the source VM. The outgoing packet can be a layer three or layer four packet. The user process space can have reduced privileges as compared to a process space in which a kernel of the host operating system executes. Obtaining the secret key for the source VM can comprise obtaining the secret key from a process which maintains a mapping between virtual machines, as identified by their respective network addresses, and the physical machine they are hosted on.

Particular embodiments of the subject matter described in this specification can be implemented so as to realize one or more of the following advantages. A network protocol for implementing virtual network pairs is described in which message encapsulation can be performed in a user process space of an operating system that does not require elevated privileges of the kernel process space of the operating system. This affords easy development and deployment of the protocol since an operating system kernel does not need to be rebuilt each time the protocol changes. An additional benefit of having the protocol implemented in the user process space is that is that certain classes of security vulnerabilities, such as kernel-level buffer overflows, are mitigated or rendered more difficult to exploit by an attacker because messages are encapsulated before being provided to the kernel. The encapsulation protocol can be fast since, in some implementations, there is no encryption of the message payload required. Since authentication credentials are embedded in messages, rather than in physical layer headers, the protocol has the ability to distinguish between multiple virtual network pairs per virtual machine. That is, the protocol enables a given virtual machine to communicate with one or more other virtual machines on the same or different host machine. The protocol provides protection from packet spoofing, i.e., counterfeit packets. Another advantage of the protocol is that network traffic between two virtual machines can be prevented unless explicitly authorized.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
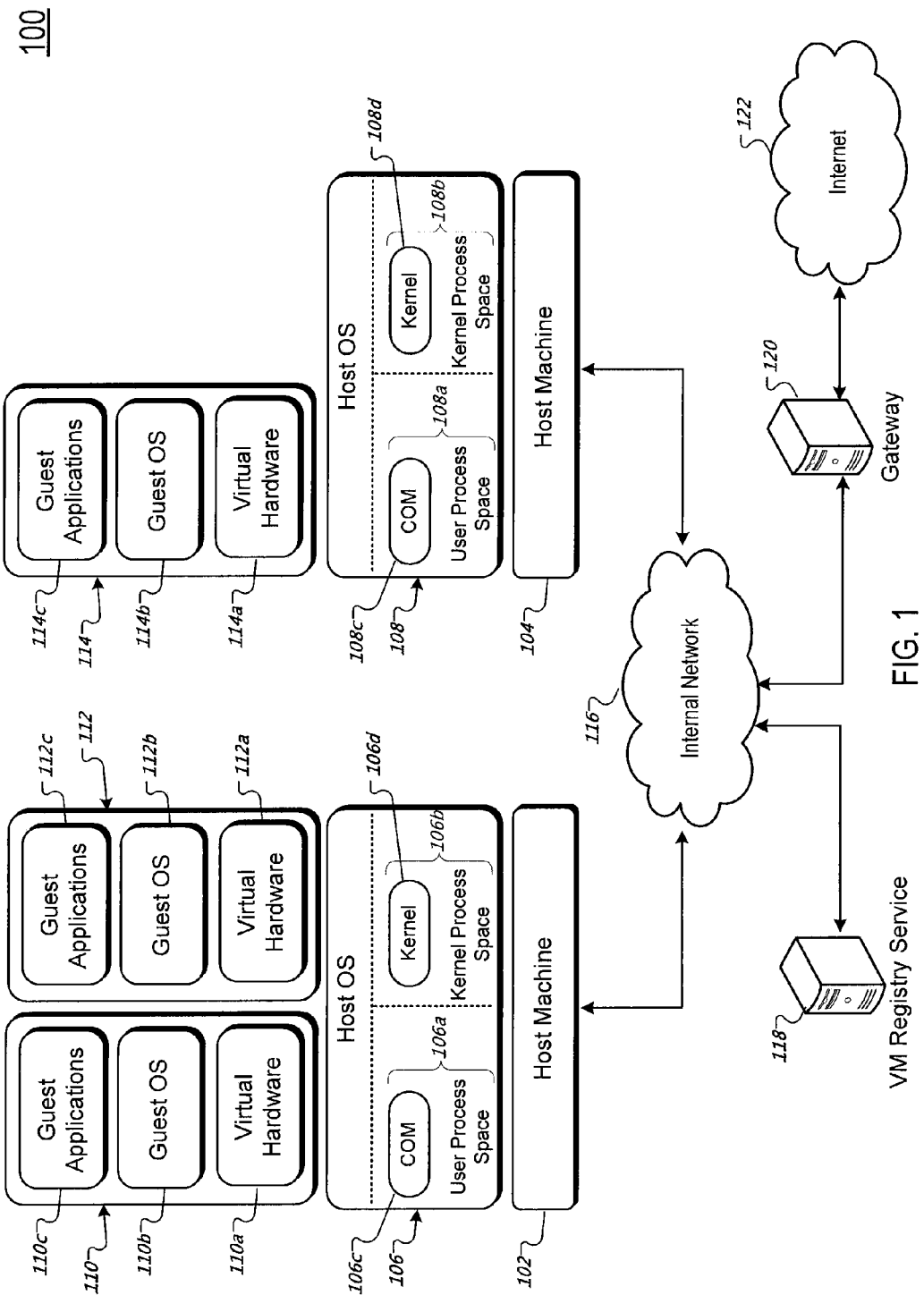
FIG. 1 is a schematic illustration of an example system that provides virtual network connectivity between virtual machines.

FIG. 1 is a schematic illustration of an example virtual machine system 100. The system 100 includes one or more host machines such as, for example, host machine 102 and host machine 104. Generally speaking, a host machine is one or more data processing apparatuses such as a rack mounted server or other computing devices. The data processing apparatus can be in different physical locations and can have different capabilities and computer architectures. Host machines can communicate with each other through an internal data communications network 116. The internal network can include one or more wired (e.g., Ethernet) or wireless (e.g., WI-FI) networks, for example. In some implementations the internal network 116 is an intranet. Host machines can also communicate with devices on external networks, such as the Internet 122, through one or more gateways 120 which are data processing apparatus responsible for routing data communication traffic between the internal network 116 and the external network 122. Other types of external networks are possible.

Each host machine executes a host operating system or other software that virtualizes the underlying host machine hardware and manages concurrent execution of one or more virtual machines. For example, the host operating system 106 is managing virtual machine (VM) 110 and VM 112, while host OS 108 is managing a single VM 114. Each VM includes a simulated version of the underlying host machine hardware, or a different computer architecture. The simulated version of the hardware is referred to as virtual hardware (e.g., virtual hardware 110a, 112a and 114a). Software that is executed by the virtual hardware is referred to as guest software. If guest software executing in a VM, or the VM itself, malfunctions or aborts, other VMs executing on the host machine will not be affected. In some implementations, a single virtual machine can also have its execution distributed over multiple physical machines. A host machine's microprocessor(s) can include processor-level mechanisms to enable virtual hardware to execute software applications efficiently by allowing guest software instructions to be executed directly on the host machine's microprocessor without requiring code-rewriting, recompilation, or instruction emulation.

Each VM (e.g., VMs 110, 112 and 114) is allocated a set of virtual memory pages from the virtual memory of the underlying host operating system and is allocated virtual disk blocks from one or more virtual disk drives for use by the guest software executing on the VM. For example, host operating system 106 allocates memory pages and disk blocks to VM 110 and VM 112, and host operating system 108 does the same for VM 114. In some implementations, a given VM cannot access the virtual memory pages assigned to other VMs. For example, VM 110 cannot access memory pages that have been assigned to VM 112. A virtual disk drive can be persisted across VM restarts. Virtual disk blocks are allocated on physical disk drives coupled to host machines or available over the internal network 116, for example. In addition to virtual memory and disk resources, VMs can be allocated network addresses through which their respective guest software can communicate with other processes reachable through the internal network 116 or the Internet 122. For example, guest software executing on VM 110 can communicate with guest software executing on VM 112 or VM 114. In some implementations, each VM is allocated one or more unique Internet Protocol (IP) version 4 or version 6 addresses and one or more User Datagram Protocol (UDP) port numbers. Other address schemes are possible.

A VM's guest software can include a guest operating system (e.g., guest operating systems 110b, 112b and 114b) which is software that controls the execution of respective guest software applications (e.g., guest applications 110c, 112c and 114c), within the VM and provides services to those applications. For example, a guest operating system could be a variation of the UNIX operating system. Other operating systems are possible. Each VM can execute the same guest operating system or different guest operating systems. In further implementations, a VM does not require a guest operating system in order to execute guest software applications. A guest operating system's access to resources such as networks and virtual disk storage is controlled by the underlying host operating system.

By way of illustration, and with reference to virtual machine 110, when the guest application 110c or guest operating system 110b attempts to perform an input/output operation on a virtual disk, initiate network communication, or perform a privileged operation, for example, the virtual hardware 110a is interrupted so that the host operating system 106 can perform the action on behalf of the virtual machine 110. The host operating system 106 can perform these actions with a process that executes in kernel process space 106b, user process space 106a, or both.

The kernel process space 106b is virtual memory reserved for the host operating system 106's kernel 106d which can include kernel extensions and device drivers, for instance. The kernel process space has elevated privileges (sometimes referred to as "supervisor mode"); that is, the kernel 106d can perform certain privileged operations that are off limits to processes running in the user process space 106a. Examples of privileged operations include access to different address spaces, access to special functional processor units in the host machine such as memory management units, and so on. The user process space 106a is a separate portion of virtual memory reserved for user mode processes. User mode processes cannot perform privileged operations directly.

In various implementations, a portion of VM network communication functionality is implemented in a communication process (e.g., communication process 106c). In some implementations, the communication process executes in the user process space (e.g., user process space 106a) of a host operating system (e.g., host operating system 106). In other implementations, the communication process can execute in the kernel process space (e.g., kernel process space 106d) of the host operating system. There can be a single communication process for all VMs executing on a host machine or multiple communication processes, one for each VM executing on a host machine. In yet further implementations, some portion of the communication process executes in the user process space and another portion executes in the kernel process space. The communication process communicates with a directory service (e.g., VM registry service 118) in order to establish a virtual network pair (VNP) between two VMs. A virtual network pair (VNP) is a logical computer network that is implemented on top of one or more physical (wired or wireless) computer networks. A VNP routes traffic between two endpoints using one or more virtual connections or links. By way of illustration, a VNP between virtual machine 110 and virtual machine 114 would route packets sent between VNP endpoints managed respectively by communication processes 106c and 108c over internal network 116. The VM registry service 118 is one or more data processing apparatus that execute software for keeping track of assignments of network addresses (e.g., IP addresses) to VMs, and for keeping track of network addresses (e.g., IP addresses) of host machines that the VMs are executing on. The data processing apparatus can be in different locations and can have different capabilities and computer architectures.

Figure 2:
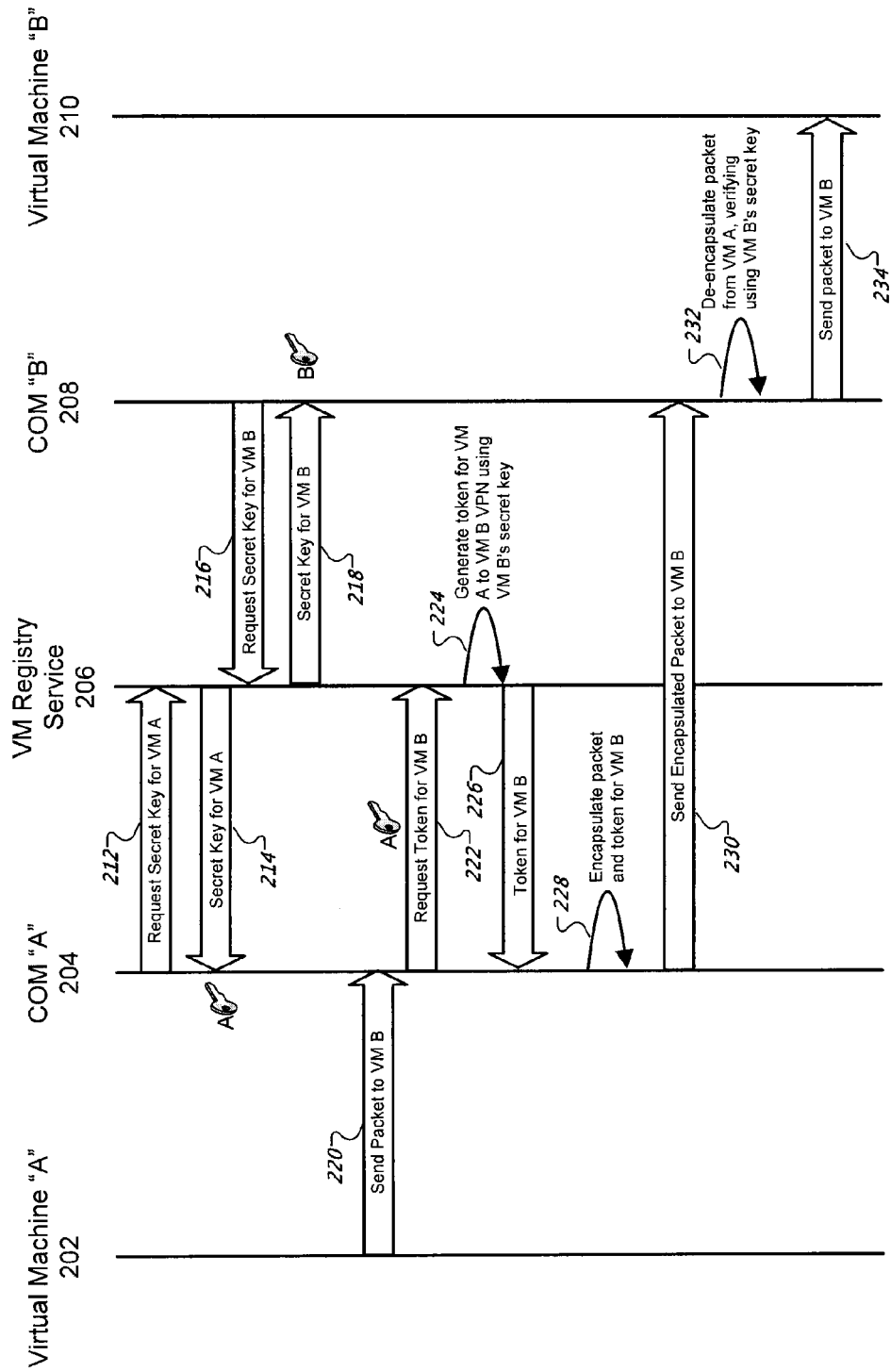
FIG. 2 is a diagram illustrating example token negotiation and message sending.

FIG. 2 is a diagram illustrating example token negotiation and message sending. Before a VM can send packets to or receive packets from other VMs, the VM (or a communication process executing on the VM's host machine) needs to obtain a secret key. A secret key is a piece of information that serves to uniquely identify a VM among all VMs connected through their respective host machines to the internal network 116, for example. The secret key can be a number, a string of characters, other data, combinations of these, or any other string of bits of sufficient entropy. The secret key can be generated in such a way that an entity with no prior knowledge of the key has no computationally feasible way of deriving the key. The secret key can be generated using, for example, a cryptographically secure pseudorandom number generator. In some implementations, the secret key is assigned to a VM by the VM registry service 118. Secret keys can also be assigned by another process besides the VM registry service. A given VM may not know what its secret key is and does not know the secret key of other VMs. In some implementations, the communication process (e.g., communication process 106c) on a given host machine (e.g., host machine 102) keeps track of the secret keys for VMs managed by the host operating system (e.g. host operating system 106).

By way of illustration, the communication process 204 on VM A 202's host machine can request a secret key for VM A 202 from the VM registry service 206 by sending a message 212 to the VM registry service 206. The request for the secret key can be sent via secure protocol that allows the VM registry service 206 to authenticate which communication process it is communicating with. Other communications between the VM registry service and communication process 204 or other communication processes can also use the same secure protocol.

The VM registry service 206 responds to the communication process 204 with a message 214 containing the secret key for VM A. As a further example, the communication process 208 on VM B 210's host machine can request a secret key for VM B 210 from the VM registry service 206 by sending a message 216 to the VM registry service 206. The VM registry service 206 responds to the communication process 208 with a message 218 containing the secret key for VM B.

Before an initial packet from one VM to another is transmitted, a VNP between the two VMs is established. In various implementations, the communication process on a given host machine is responsible for establishing VNPs. For example, communication process 106c is responsible for establishing VNPs for VM 110 and VM 112. Likewise, communication process 108c can do the same for VM 114. Each VM can communicate with one or more other VMs using a separate VNP for each. Referring again to FIG. 2 and by way of example, VM A 202 attempts to transmit a packet 220 to VM B 210. In some implementations, the packet is an IP version 4 or version 6 packet. In other implementations, the packet is an Open Systems Interconnection Reference Model layer 3 or higher protocol packet, such as, for example, UDP, Transmission Control Protocol (TCP), and so on. Other types of packets are possible. The packet is intercepted by the communication process 204 of the host operating system on which VM A 202 is executing. The communication process 204 determines that a VNP between VM A 202 and VM B 210 has not yet been established. This being the case, the communication process 204 requests a token to be used to communicate with VM B 210 from the VM registry service 206. A token is required in order to establish a unidirectional VNP from a source VM to a destination VM. The token request 222 can contain the secret key for VM A and a network address (e.g., IP address) of the destination VM B 210, for example.

In response to the request 222, the VM registry service 206 uses the secret key S_a of VM A 202 to look up or determine the following attributes of VM A 202:

IP_VM_a, the IP address assigned to VM A;

Phys_Port_a, the UDP port assigned to VM A on VM A's host machine;

Phys_IP_a, the IP address of VM A's host machine; and expiry_a_b, the validity period of the token which, in some implementations, is the current time plus a time-to-live (TTL). The TTL can be on the order of minutes (e.g., 10 minutes) or other granularities. In some implementations, expiry_a_b is set to a value (e.g., −1) to indicate that the token never expires.

In some implementations, the VM registry service 206 verifies that the request 222 was actually transmitted from Phys_IP_a and otherwise denies the request. In further implementations, the VM registry service 206 can consult a traffic policy to determine if VM A 202 should be allowed to communicated with VM B 210 and, if not, denies the request.

In various implementations, the VM registry service 206 computes the token T_a_b for traffic from VM A 202 to VM B 210 as follows (FIG. 2 at 224):

$$T\_a\_b = \text{TruncMAC}(S\_b, \text{Phys\_IP}\_a | \text{Phys\_IP}\_b | \text{Phys\_Port}\_a | \text{Phys\_Port}\_b | \text{IP\_VM}\_a | \text{IP\_VM}\_b | \text{expiry}\_a\_b)$$

Where '|' denotes concatenation, S_b is VM B 210's secret key, and TruncMAC is a Message Authentication Code (MAC) function (e.g., HMAC-SHA1, or TBD) that has been truncated, for example, to 64 bits. Other MAC functions are possible. In some implementations, all of the fields being concatenated are fixed size, i.e., the concatenation is uniquely determined without the need for separators. Although the fields are concatenated in a certain order, other field orderings are possible.

The VM registry service 206 returns the tuple (Phys_IP_b, Phys_Port_b, T_a_b, expiry_a_b) to communication process 204 in a response 226 to the request 222, where Phys_IP_b is the IP address of the host machine on which VM B 210 is executing and Phys_Port_b is the UDP port on VM B's host machine that has been reserved for receiving traffic directed to VM B 210. Once the communication process 204 receives the tuple, the packet 220 can be encapsulated and transmitted to VM B's host machine using the Phys_IP_b and Phys_Port_b as the destination address of the packet. Future packets destined for VM B 210 can reuse the tuple information until expiry_a_b has passed to. Once the expiry_a_b has passed (if it is not set to a value indicating that the token never expires), a new token can be obtained as described above, for example. In order for VM B 210 to send packet to VM A 202, a token is needed to establish a unidirectional VNP from VM B 210 to VM A 202. The same process can be followed as outlined above or, alternatively, a packet sent from VM A to VM B can include the token. This alternative is described further below.

Figure 3:
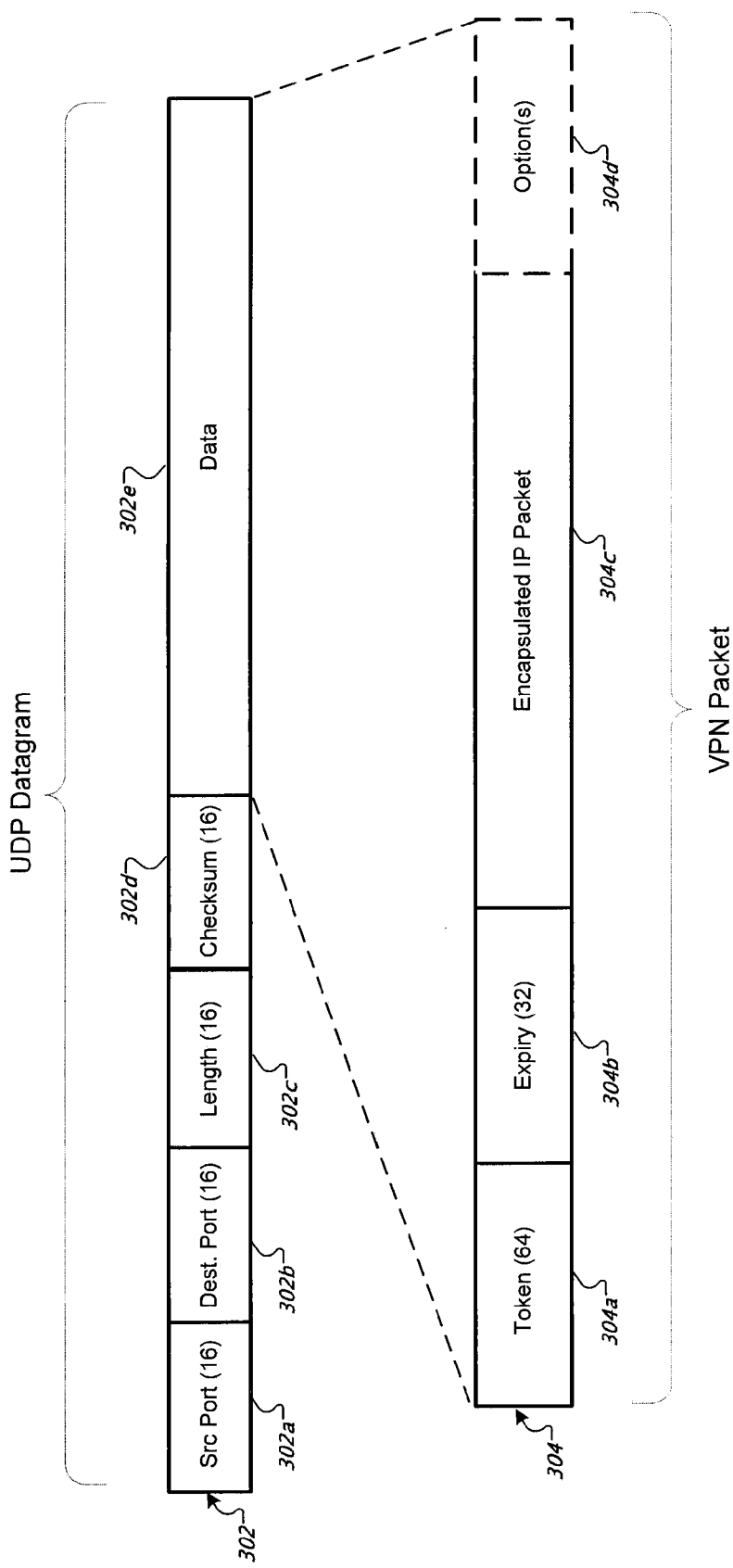
FIG. 3 is a diagram of an example encapsulation packet.

Outgoing packets (e.g., outgoing packet 220) such as IPv4 and IPv6 packets are encapsulated by the communication process, or another process, using the obtained token. Encapsulation of an outgoing packet takes place before packet transmittal. In some implementations, the encapsulation packet is a UDP datagram. Other types of encapsulation packets are possible. By way of illustration, an outgoing packet is encapsulated in the data portion 302e of a UDP packet 302 as shown in FIG. 3. The UDP packet 302 has a header consisting of a source port number 302a (16 bits), a destination port number 302b (16 bits), a length field 302c (16 bits) which is the length of the data portion 302e, and a checksum 302d (16 bits). In various implementations, the source port 302a is set to Phys_Port_a and the destination port 302b is set to Phys_Port_b. The data portion 302e is variable length and contains the outgoing packet. In some implementations, the data portion 302e can be encrypted. Symmetric or asymmetric encryption key algorithms can be used to encrypt some or all of the data portion 302e, for example. The encryption keys can be distributed by a VM registry service, e.g., VM registry service 118 of FIG. 1. In some implementations, a conventional key negotiation protocol, e.g., the Diffie-Hellman protocol, is used to encrypt the data portion 502e. The data portion 302e contains VNP packet 304 that includes the token T_a_b 304a (64 bits), the expiry time expiry_a_b 304b (32 bits), the outgoing packet 304c (variable length), and an optional options field 304d (variable length). Other lengths for the VNP packet fields are possible. In addition, the fields of the VNP packet 304 can occur in a different order than that which is illustrated in FIG. 3. As described above, the outgoing packet can be, for instance, an OSI Reference Model layer 2 or higher protocol packet. In some implementations, the outgoing packet is an IP packet. Other outgoing packet types are possible including, for example, Ethernet packets. Once encapsulation is complete, the communication process or another process on the respective host machine's operating system can transmit the UDP packet 302 in an IP packet with a source IP address of Phys_IP_a and a destination IP address of Phys_IP_b. Alternatively, the encapsulation packet can be transmitted using a different protocol.

In some implementations, the VNP packet includes an options field 304d. The options field 304d allows a sending VM to convey additional information to a receiving VM. If the encapsulation packet is a UDP packet, as illustrated in FIG. 3, the length of the options field can be calculated based on the difference of the value specified in the length 302c field and the combined size of the token 304a, expiry 304b, and encapsulated IP packet 304c fields. The size of the encapsulated IP packet 304c is available in the header of the packet 304c. The options field 304d can be omitted from the VNP packet 304 if its inclusion would push the size of the encapsulation packet (e.g., UDP packet 302) above the maximum transmission unit (MTU) which would result in packet fragmentation. In further implementations a field such as a bit flag, for example, can be added to the VNP packet 304 to indicate the presence of an options field 304d.

The options field 304d can be used to send a return VNP token T_b_a to the receiving VM in order to avoid the receiving VM having to obtain a token in order to reply to the sending VM. The communication process 204 for VM A 202 has all information on hand that is needed to compute T_b_a; in particular, the token is signed with VM A 202's secret key S_a. The return token T_b_a can likely be included in the first packet sent between VM A 202 and VM B 210 since, in the case of TCP, the first packet is a small SYN packet which leaves sufficient room for the options field 304d containing the return token without the resulting encapsulation packet exceeding MTU. The options field 504d can also be used to send various protocol extensions, to exchange encryption keys, to send control flow information, and so on.

Returning to FIG. 2, the encapsulation packet is then sent 230 to the destination host machine for VM B 210 where it is intercepted by the communication process 208 (or by another process). The communication process 208 de-encapsulates the received message (FIG. 2 at 232) and then delivers the original packet to the VM B 210. This can be done by injecting the IP packet into the network stack as an Ethernet frame, for example.

Figure 4:
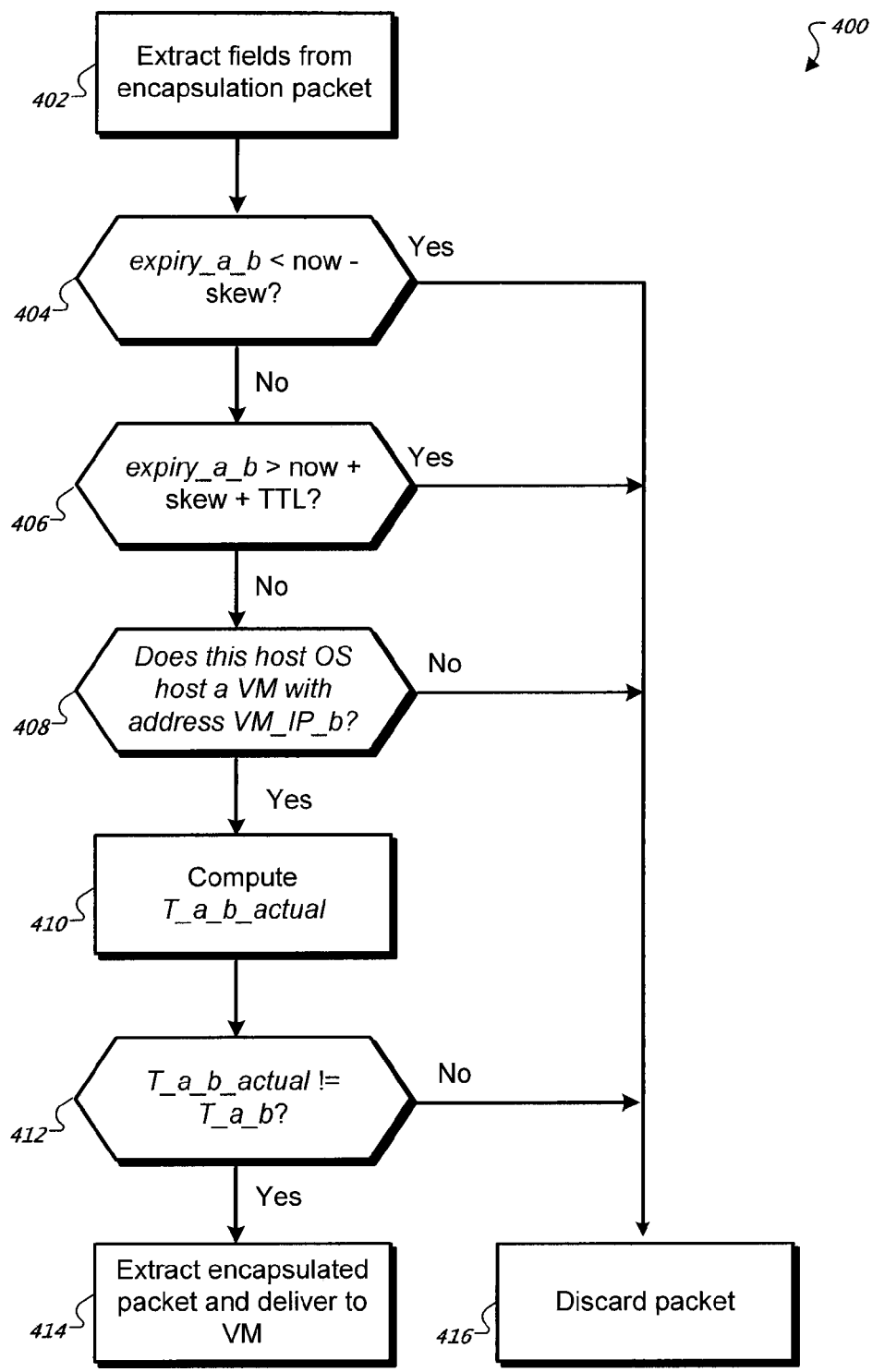
FIG. 4 is a flow diagram illustrating an example technique for packet de-encapsulation.

FIG. 4 is a flow diagram illustrating an example technique 400 for packet de-encapsulation as can be performed by the communication process 208 or another process on the destination host machine. The de-encapsulation process can be performed without the need to communicate with the VM registry service 118. With reference to FIG. 2, when an encapsulation packet is received fields from the packet are extracted in order to validate the packet (402). The source and destination IP addresses and ports of the UDP packet are extracted: Phys_IP_a, Phys_IP_b, Phys_Port_a, and Phys_Port_b. The source and destination address of the encapsulated IP datagram are also extracted: IP_VM_a, IP_VM_b. Finally, the token and expiry are extracted from the encapsulation header: T_a_b and expiry_a_b.

If expiry_a_b is less than the current time minus a skew (404), the encapsulation packet is discarded (416). In some implementations, the skew is an estimate of likely clock skew between host machine clocks (e.g., a few seconds). The skew can be set to zero if host machine clocks are synchronized. Otherwise, if expiry_a_b is greater than the current time plus skew and TTL (406), the encapsulation packet is also discarded (416). A check is performed to verify whether the host operating system is hosting a VM having the address VM_IP_b (408). If not, the encapsulation packet is discarded (416). The extracted fields and VM B 210's secret key S_b are used to calculate T_a_b_actual as follows (410):

$$T\_a\_b\_\text{actual} = \text{TruncMAC}(S\_b, \text{Phys\_IP}\_a | \text{Phys\_IP}\_b | \text{Phys\_Port}\_a | \text{Phys\_Port}\_b | \text{IP\_VM}\_a | \text{IP\_VM}\_b | \text{expiry}\_a\_b).$$

T_a_b actual is then compared to the token T_a_b from the encapsulation packet (412). If T_a_b actual is the same as T_a_b then the encapsulated packet (e.g., encapsulated IP packet 304c) is extracted from the encapsulation packet (e.g., encapsulation packet 302) and is delivered to VM B 210 (414). Otherwise, the encapsulation packet is discarded (416).

In further implementations, and with reference to FIG. 1, the gateway 120 can serve as an encapsulation gateway to allow virtual machines on the internal network 116 to communicate with hosts on the external network 122. When the gateway 120 receives an encapsulated packet from a VM (e.g., VM 114) destined for the external network 122, the gateway 120 will validate the token of the VNP packet as described above with reference to FIG. 4, for example. If the token validation fails, the packet is discarded. If validation succeeds, the encapsulation packet is de-encapsulated and the encapsulated packet is extracted and injected into the gateway 120's network stack where it is subject to normal routing. Upon receiving a non-encapsulated packet from the external network 122 destined for a VM, the gateway 120 obtains a token (e.g., from the VM registry service 118 or from a local cache of tokens) for the destination of the packet and then encapsulates the packet as described above with reference to FIG. 2, for example. The gateway 120 then transmits the encapsulated packet to the destination VM's host machine. If a VM queries the VM registry service 118 for a token that is for a destination computer that is not on the internal network 116, the VM registry service 118 responds with a tuple (Phys_IP_b, Phys_Port_b, T_a_b, expiry_a_b) where Phys_IP_b, Phys_Port_b and T_a_b are for the gateway 120, rather than the ultimate destination, so that the VM's packets are routed through, and de-encapsulated by, the gateway 120. In some implementations, the VM can use this tuple to send packets to any destination on the external network 122 thus avoiding having to obtain a tuple from the VM registry service 118 for each unique destination.

Figure 5:
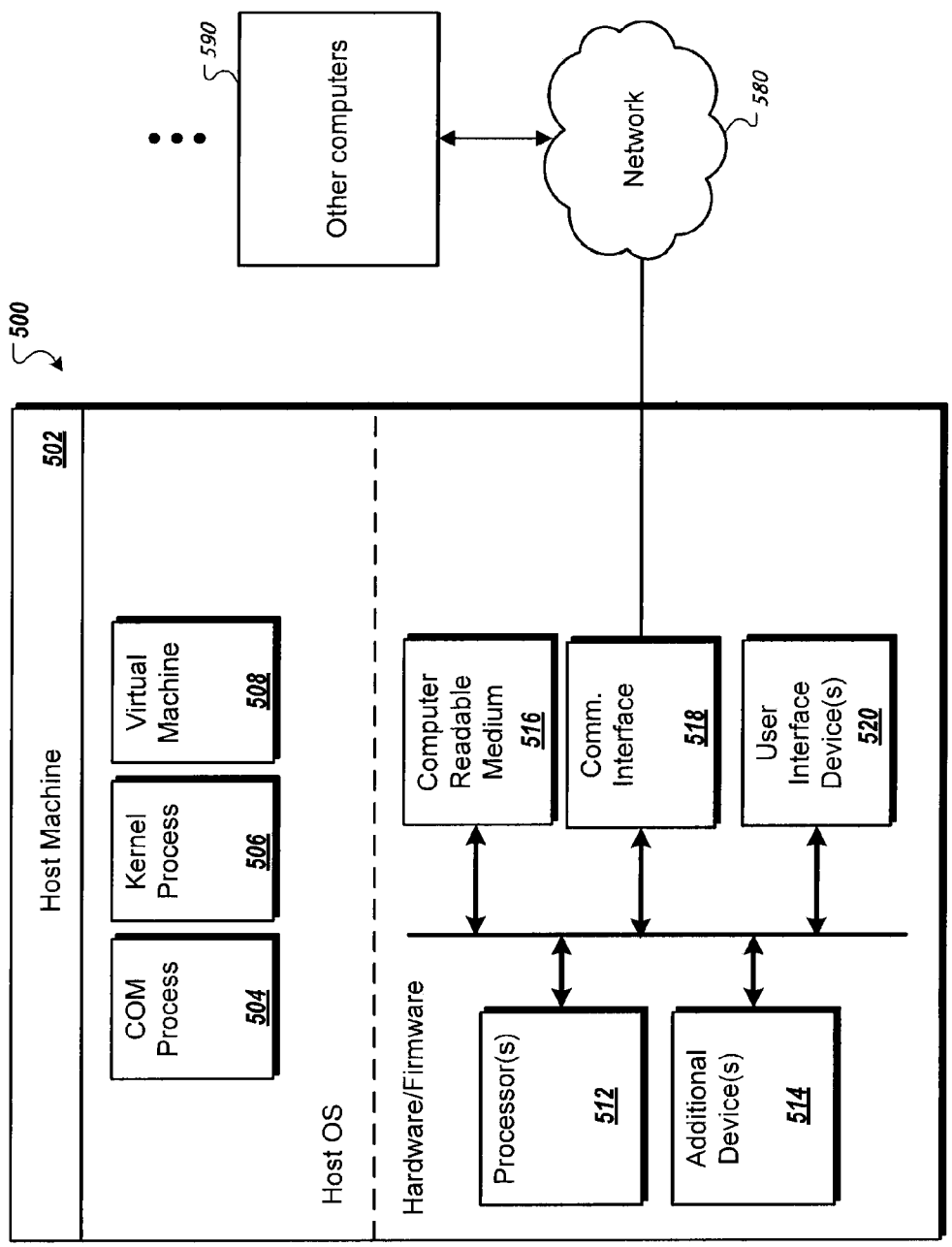
FIG. 5 is a schematic diagram of an example host machine.

FIG. 5 is a schematic diagram of an example host machine. The host machine 500 generally consists of a data processing apparatus 502. The data processing apparatus 502 can optionally communicate with one or more other computers 590 through a network 580. While only one data processing apparatus 502 is shown in FIG. 5, multiple data processing apparatus can be used in one or more locations. The data processing apparatus 502 includes various modules, e.g. executable software programs. One of the modules is the kernel 506 of a host operating system (e.g., host operating system 106). A communication process module 504 (e.g., communication process 106c) is configured to establish VNPs, encapsulate packets and to de-encapsulate packets. A virtual machine module 508 (e.g., virtual machine 110) includes virtual hardware (e.g., virtual hardware 110a), a guest operating system (e.g., guest operating system 110b), and guest applications (guest applications 110c). Although several software modules are illustrated, there may be fewer or more software modules. Moreover, the software modules can be distributed on one or more data processing apparatus connected by one or more networks or other suitable communication mediums.

The data processing apparatus 502 also includes hardware or firmware devices including one or more processors 512, one or more additional devices 514, a computer readable medium 516, a communication interface 518, and optionally one or more user interface devices 520. Each processor 512 is capable of processing instructions for execution within the data processing apparatus 502. In some implementations, the processor 512 is a single or multi-threaded processor. Each processor 512 is capable of processing instructions stored on the computer readable medium 516 or on a storage device such as one of the additional devices 514. The data processing apparatus 502 uses its communication interface 518 to communicate with one or more computers 590, for example, over a network 580. Examples of user interface devices 520 include a display, a camera, a speaker, a microphone, a tactile feedback device, a keyboard, and a mouse. The data processing apparatus 502 can store instructions that implement operations associated with the modules described above, for example, on the computer readable medium 516 or one or more additional devices 514, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by a data processing apparatus, the method comprising:
   in a user process space of a host operating system, wherein the host operating system hosts one or more distinct virtual machines each being a hardware virtualization, performing the following:
   receiving, at a first communication process of the host operating system, an outgoing packet from a source virtual machine (VM) of the one or more distinct virtual machines, the outgoing packet destined for a destination VM, wherein the destination VM is one of the one or more distinct virtual machines hosted by the host operating system;
   obtaining, from a VM registry, a source secret key for the source VM, the source secret key not being known by the destination VM;
   requesting a first token from the VM registry, the request including the source secret key and data identifying the destination VM;
   obtaining the first token, from the VM registry, the first token being used to establish a unidirectional virtual network pair between the source VM and the destination VM, wherein the first token is derived at least partly from both a destination secret key for the destination VM and a network address of the destination VM, where the destination secret key is not known by the source VM;
   encapsulating, at the first communication process of the host operating system, the outgoing packet in a second packet along with the first token and a token expiration time;
   receiving, at a second communication process of the host operating system, the second packet directed to the destination VM;
   verifying the first token wherein verifying the first token comprises:
      generating, in the user process space, a verification token based on at least the destination secret key for the destination VM and the network address of the destination VM; and
      verifying the token in response to determining that the first token matches the verification token; and
   de-encapsulating the second packet and providing the outgoing packet to the destination VM responsive to the verifying.

2. The method of claim 1 wherein the second packet includes a second token that the destination VM can use to send a packet to the source VM.

3. The method of claim 1 wherein the token is a hash-based message authentication code.

4. The method of claim 1 wherein a respective guest operating system executes on each of the virtual machines.

5. The method of claim 1 wherein the destination VM is on a same physical machine as the source VM.

6. The method of claim 1 wherein the outgoing packet is a layer three packet.

7. The method of claim 1 wherein the second packet is a layer four packet.

8. The method of claim 1 wherein the user process space has reduced privileges as compared to a process space wherein a kernel of the host operating system executes.

9. The method of claim 1 wherein obtaining the secret key for the source VM comprises obtaining the secret key from a process which maintains a mapping between virtual machines, as identified by their respective network addresses, and the physical machine they are hosted on.

10. A non-transitory storage medium encoded with instructions which, when executed by data processing apparatus, cause the data processing apparatus to perform operations comprising:
  in a user process space of a host operating system, wherein the host operating system hosts one or more distinct virtual machines each being a hardware virtualization, performing the following:
    receiving, at a first communication process of the host operating system, an outgoing packet from a source virtual machine (VM) of the one or more distinct virtual machines, the outgoing packet destined for a destination VM, wherein the destination VM is one of the one or more distinct virtual machines hosted by the host operating system;
    obtaining, from a VM registry, a source secret key for the source VM, the source secret key not being known by the destination VM;
    requesting a first token from the VM registry, the request including the source secret key and data identifying the destination VM;
    obtaining the first token, from the VM registry, the first token being used to establish a unidirectional virtual network pair between the source VM and the destination VM, wherein the first token is derived at least partly from both a destination secret key for the destination VM and a network address of the destination VM, where the destination secret key is not known by the source VM;
    encapsulating, at the first communication process of the host operating system, the outgoing packet in a second packet along with the first token and a token expiration time;
    receiving, at a second communication process of the host operating system, the second packet directed to the destination VM;
    verifying the first token wherein verifying the first token comprises:
      generating, in the user process space, a verification token based on at least the destination secret key for the destination VM and the network address of the destination VM; and
      verifying the token in response to determining that the first token matches the verification token; and
    de-encapsulating the second packet and providing the outgoing packet to the destination VM responsive to the verifying.

11. The storage medium of claim 10 wherein the second packet includes a token that the destination VM can use to send a packet to the source VM.

12. The storage medium of claim 10 wherein the token is a hash-based message authentication code.

13. The storage medium of claim 10 wherein a respective guest operating system executes on each of the virtual machines.

14. The storage medium of claim 10 wherein the destination VM is on a same physical machine as the source VM.

15. The storage medium of claim 10 wherein the outgoing packet is a layer three packet.

16. The storage medium of claim 10 wherein the second packet is a layer four packet.

17. The storage medium of claim 10 wherein the user process space has reduced privileges as compared to a process space wherein a kernel of the host operating system executes.

18. The storage medium of claim 10 wherein obtaining the secret key for the source VM comprises obtaining the secret key from a process which maintains a mapping between virtual machines, as identified by their respective network addresses, and the physical machine they are hosted on.

19. A system comprising:
  a storage medium encoded with instructions;
  data processing apparatus operable to execute the instructions to perform operations comprising:
  in a user process space of a host operating system, wherein the host operating system hosts one or more distinct virtual machines each being a hardware virtualization, performing the following:
    receiving, at a first communication process of the host operating system, an outgoing packet from a source virtual machine (VM) of the one or more distinct the virtual machines, the outgoing packet destined for a destination VM, wherein the destination VM is one of the one or more distinct virtual machines hosted by the host operating system;
    obtaining, from a VM registry, a source secret key for the source VM, the source secret key not being known by the destination VM;
    requesting a first token from the VM registry, the request including the source secret key and data identifying the destination VM;
    obtaining the first token, from the VM registry, the first token being used to establish a unidirectional virtual network pair between the source VM and the destination VM, wherein the first token is derived at least partly from both a destination secret key for the destination VM and a network address of the destination VM, where the destination secret key is not known by the source VM;
    encapsulating, at the first communication process of the host operating system, the outgoing packet in a second packet along with the first token and a token expiration time;
    receiving, at a second communication process of the host operating system, the second packet directed to the destination VM;
    verifying the first token wherein verifying the first token comprises:
      generating, in the user process space, a verification token based on at least the destination secret key for the destination VM and the network address of the destination VM; and
      verifying the token in response to determining that the first token matches the verification token; and
    de-encapsulating the second packet and providing the outgoing packet to the destination VM responsive to the verifying.

20. The system of claim 19 wherein the second packet includes a token that the destination VM can use to send a packet to the source VM.

21. The system of claim 19 wherein the token is a hash-based message authentication code.

22. The system of claim 19 wherein a respective guest operating system executes on each of the virtual machines.

23. The system of claim 19 wherein the destination VM is on a same physical machine as the source VM.

24. The system of claim 19 wherein the outgoing packet is a layer three packet.

25. The system of claim 19 wherein the second packet is a layer four packet.

26. The system of claim 19 wherein the user process space has reduced privileges as compared to a process space wherein a kernel of the host operating system executes.

27. The system of claim 19 wherein obtaining the secret key for the source VM comprises obtaining the secret key from a process which maintains a mapping between virtual machines, as identified by their respective network addresses, and the physical machine they are hosted on.

* * * * *